US012558961B2

(12) United States Patent
Ota et al.

(10) Patent No.: US 12,558,961 B2
(45) Date of Patent: Feb. 24, 2026

(54) DISPLAY DEVICE, DISPLAY METHOD, AND DISPLAY PROGRAM OF A VEHICLE SURROUNDINGS IMAGE

(71) Applicant: TOYOTA JIDOSHA KABUSHIKI KAISHA, Toyota (JP)

(72) Inventors: Takashi Ota, Tokyo (JP); Takahiko Kuwabara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 18/629,136

(22) Filed: Apr. 8, 2024

(65) Prior Publication Data

US 2024/0351440 A1 Oct. 24, 2024

(30) Foreign Application Priority Data

Apr. 19, 2023 (JP) ................................. 2023-068675

(51) Int. Cl.
B60K 35/80 (2024.01)
B60K 35/28 (2024.01)
(Continued)

(52) U.S. Cl.
CPC .............. B60K 35/80 (2024.01); B60K 35/28 (2024.01); B60W 40/08 (2013.01); B60W 50/14 (2013.01);
(Continued)

(58) Field of Classification Search
None
See application file for complete search history.

(56) References Cited

U.S. PATENT DOCUMENTS

2018/0154903 A1* 6/2018 Song ................. B60W 60/0059
2020/0207366 A1* 7/2020 Kapuria ................. B60K 35/85
(Continued)

FOREIGN PATENT DOCUMENTS

JP 2019-109590 A 7/2019
JP 2022-039936 A 3/2022
JP 2022-048538 A 3/2022

OTHER PUBLICATIONS

Black Tesla, Tesla v8.0 Autopilot—Warning Interval & Autosteer Unavailable, Sep. 24, 2016, Youtube, https://www.youtube.com/watch?v=isZ3fSbE_pg&t=322s (Year: 2016).*

*Primary Examiner* — James J Lee
*Assistant Examiner* — Andrew Sang Kim
(74) *Attorney, Agent, or Firm* — Dinsmore & Shohl LLP

(57) ABSTRACT

A display device includes: a steering non-holding recognition unit configured to recognize a steering non-holding state in which a driver of the vehicle does not hold steady a steering wheel of the vehicle based on detection result of a steering sensor of the vehicle; and a display control unit configured to display the vehicle surroundings image on the display unit based on detection result of an external sensor of the vehicle. The display control unit reduces visibility of the vehicle surroundings image in the display unit when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

6 Claims, 7 Drawing Sheets

(51) Int. Cl.
| | |
|---|---|
| *B60W 40/08* | (2012.01) |
| *B60W 50/14* | (2020.01) |
| *B60W 60/00* | (2020.01) |
| *G06V 20/59* | (2022.01) |

(52) U.S. Cl.
CPC ......... *B60W 60/001* (2020.02); *G06V 20/597* (2022.01); *B60W 2040/0818* (2013.01); *B60W 2050/146* (2013.01); *B60W 2420/403* (2013.01); *B60W 2540/223* (2020.02); *B60W 2540/229* (2020.02)

(56) References Cited

U.S. PATENT DOCUMENTS

| | | | |
|---|---|---|---|
| 2022/0063649 A1* | 3/2022 | Takabatake ....... | B60W 60/0053 |
| 2023/0182764 A1* | 6/2023 | Fukui ..................... | G06F 3/147 |
| | | | 345/660 |

* cited by examiner

DISPLAY DEVICE, DISPLAY METHOD, AND DISPLAY PROGRAM OF A VEHICLE SURROUNDINGS IMAGE

CROSS-REFERENCE TO RELATED APPLICATION

This application claims the benefit of priority from Japanese Patent Application No. 2023-068675, filed on Apr. 19, 2023, the entire contents of which are incorporated herein by reference.

TECHNICAL FIELD

The present disclosure relates to a display device, a display method, and a display program.

BACKGROUND

In the related art, there is known a display device that displays a remaining time until an operation mode is switched from an autonomous driving mode to a manual driving mode based on a duration time during which a state of hands of a driver being not continuously in contact with a steering wheel in the autonomous driving mode continues (for example, Japanese Patent Application Laid-Open No. 2019-109590).

During execution of autonomous driving control at a predetermined support level, the driver is required to visually confirm a surrounding environment of a surrounding situation of the vehicle. However, in a case where a highly accurate image representing the surrounding situation of the vehicle is displayed on an in-vehicle display unit, there is a possibility that the driver confirms the surrounding situation of the vehicle by referring to the image of the display unit instead of visual observation.

SUMMARY

An example of the present disclosure is a display device configured to display a vehicle surroundings image representing a surrounding situation of a vehicle on an in-vehicle display unit, the display device includes: a steering non-holding recognition unit configured to recognize a steering non-holding state in which a driver of the vehicle does not hold steady a steering wheel of the vehicle based on detection result of a steering sensor of the vehicle; and a display control unit configured to display the vehicle surroundings image on the display unit based on detection result of an external sensor of the vehicle. The display control unit reduces visibility of the vehicle surroundings image in the display unit when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

According to the display device according to an example of the present disclosure, the visibility of the vehicle surroundings image in the display unit is reduced when the steering non-holding state continues for the predetermined first period or longer, compared to visibility of the vehicle surroundings image when the steering non-holding state does not continue for the first period or longer, during the execution of the autonomous driving control in which the driver is required to visually confirm the surrounding environronment. Accordingly, it becomes more difficult for the driver to confirm the surroundings around the vehicle by using the vehicle surroundings image in the display unit than when the steering non-holding state does not continue for the first period or longer. As a result, it is possible to prompt the driver to visually confirm the surrounding situation of the vehicle during the execution of the autonomous driving control in which the driver is required to visually confirm the surrounding environment.

In some examples, the display device may further include a driver state recognition unit configured to recognize a neglect of a visual environment confirmation of the driver based on an image captured by a driver monitor camera that images the driver. The display control unit may reduce visibility of the vehicle surroundings image in the display unit when the neglect of a visual environment confirmation continues for a predetermined second period or longer, compared to visibility of the vehicle surroundings image when the neglect of a visual environment confirmation does not continue for the second period or longer, during execution of autonomous driving control in which the driver is required to visually confirm the surrounding environment.

In some examples, the display device may further include a driver state recognition unit configured to recognize a state of reduced alertness of the driver based on an image captured by a driver monitor camera that images the driver. The display control unit may reduce visibility of the vehicle surroundings image in the display unit when the state of reduced alertness continues for a predetermined third period or longer, compared to visibility of the vehicle surroundings image when the state of reduced alertness does not continue for the third period or longer, during execution of autonomous driving control in which the driver is required to visually confirm the surrounding environment.

Another example of the present disclosure is a display method of displaying a vehicle surroundings image representing a surrounding situation of a vehicle on an in-vehicle display unit, the display method includes: a step of recognizing a steering non-holding state in which a driver of the vehicle does not hold steady a steering wheel of the vehicle based on detection result of a steering sensor of the vehicle, and a step of displaying the vehicle surroundings image on the display unit based on detection result of an external sensor of the vehicle. In the step of displaying the vehicle surroundings image on the display unit, visibility of the vehicle surroundings image in the display unit is to be reduced when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

According to the display method according to another example of the present disclosure, the visibility of the vehicle surroundings image in the display unit is reduced when the steering non-holding state continues for the predetermined first period or longer, compared to visibility of the vehicle surroundings image when the steering non-holding state does not continue for the first period or longer, during the execution of the autonomous driving control in which the driver is required to visually confirm the surrounding environment. Accordingly, it becomes more difficult for the driver to confirm the surroundings around the vehicle by using the vehicle surroundings image in the display unit than when the steering non-holding state does not continue for the first period or longer. As a result, it is possible to prompt the driver to visually confirm the surrounding situation of the vehicle during the execution of the autonomous driving control in which the driver is required to visually confirm the surrounding environment.

Still another example of the present disclosure is a display program that causes a computer to function as a display device that displays a vehicle surroundings image representing a surrounding situation of a vehicle on an in-vehicle display unit, the display program causes the computer to function as: a steering non-holding recognition unit configured to recognize a steering non-holding state in which a driver of the vehicle does not hold steady a steering wheel of the vehicle based on detection result of a steering sensor of the vehicle; and a display control unit configured to display the vehicle surroundings image on the display unit based on a detection result of an external sensor of the vehicle, wherein the display control unit reduces visibility of the vehicle surroundings image in the display unit when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

According to the display program related to still another example of the present disclosure, the visibility of the vehicle surroundings image in the display unit is reduced when the steering non-holding state continues for the predetermined first period or longer, compared to visibility of the vehicle surroundings image when the steering non-holding state does not continue for the first period or longer, during the execution of the autonomous driving control in which the driver is required to visually confirm the surrounding environment. Accordingly, it becomes more difficult for the driver to confirm the surroundings around the vehicle by using the vehicle surroundings image in the display unit than when the steering non-holding state does not continue for the first period or longer. As a result, it is possible to prompt the driver to visually confirm the surrounding situation of the vehicle during the execution of the autonomous driving control in which the driver is required to visually confirm the surrounding environment.

According to examples of the present disclosure, it is possible to prompt a driver to visually confirm a surrounding situation of a vehicle during execution of autonomous driving control in which the driver is required to visually confirm the surrounding environment.

DETAILED DESCRIPTION

Figure 1:
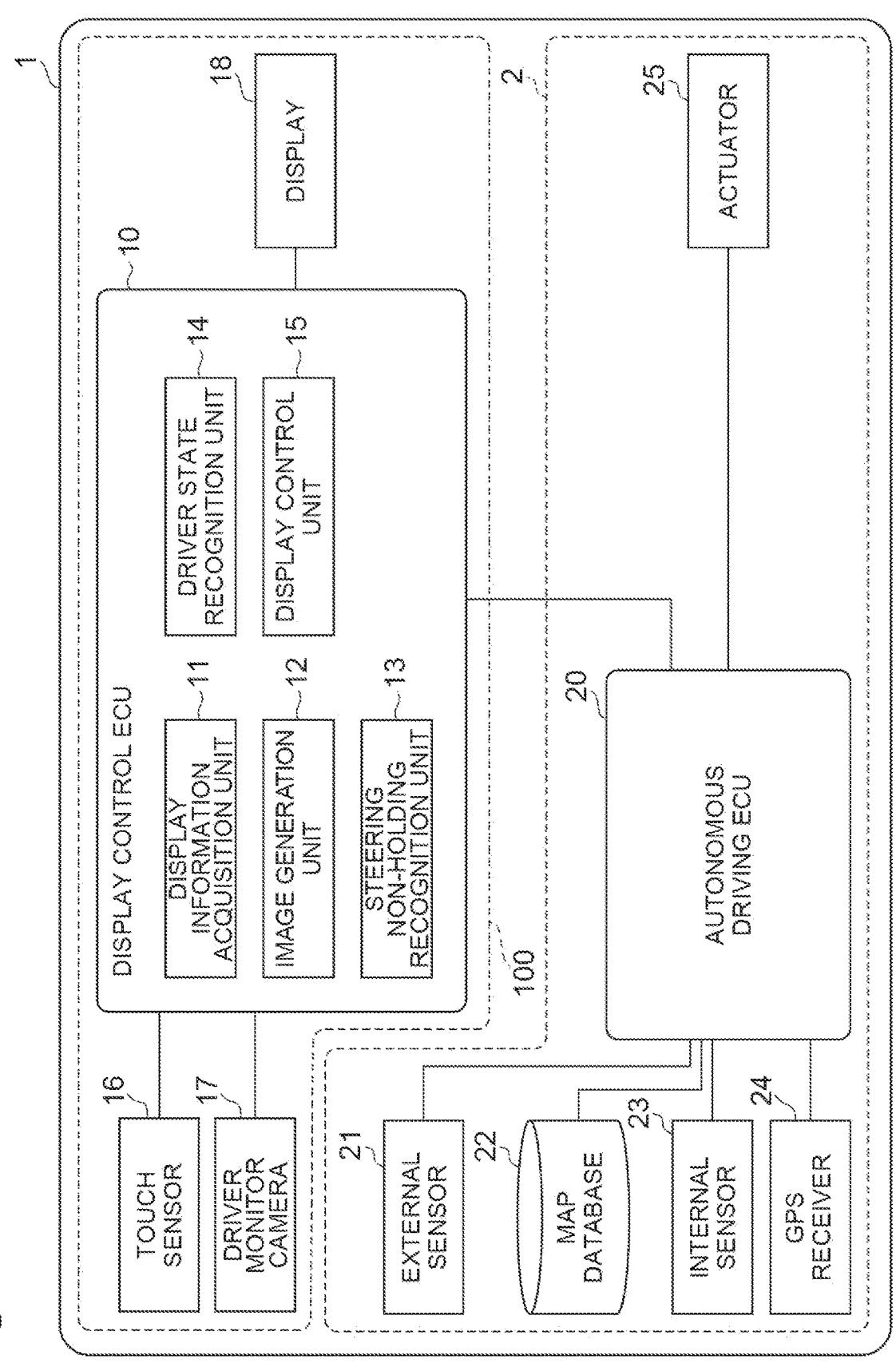
FIG. 1 is a block diagram illustrating a vehicle including an example display device.

Hereinafter, an example of the present disclosure will be described with reference to the drawings. In the following description, the same or corresponding elements are denoted by the same reference numerals, and redundant description is omitted.

FIG. 1 is a block diagram illustrating a vehicle including an example display device. As shown in FIG. 1, a display device 100 is mounted on a vehicle 1 capable of performing an autonomous driving control. The vehicle 1 is, for example, a passenger car.

[Configuration of Autonomous Driving System]

The vehicle 1 is equipped with an autonomous driving system 2. The autonomous driving system 2 is a system that performs autonomous driving control of the vehicle 1. Autonomous driving control is a vehicle control in which the vehicle 1 is automatically driven along a road on which the vehicle 1 is traveling without a driving operation by a driver. Autonomous driving control that can be executed by the vehicle 1 includes autonomous driving control for which the driver is required to visually confirm a surrounding environment. Autonomous driving control in which visual confirmation of the surrounding environment is required for the driver corresponds to autonomous driving control at a predetermined assist level in which driving responsibility is imposed on the driver, for example. The driver is required at least intermittently to hold steady a steering wheel of the vehicle 1 in the autonomous driving control in which the driver is required to visually confirm the surrounding environment, as will be described later. Here, "to hold steady the steering" means so-called "hands-on."

The autonomous driving system 2 includes an autonomous driving ECU (Electronic Control Unit) 20, an external sensor 21, a map database 22, an internal sensor 23, GPS (Global Positioning System) receiver 24, and an actuator 25.

The autonomous driving ECU 20 includes a central processing unit (CPU), a read only memory (ROM), RAM (Random Access Memory), CAN (Controller Area Network) communication circuit, and the like. The autonomous driving ECU 20 controls hardware based on a signal output from the CPU, and realizes functions of the autonomous driving ECU 20 described later. The autonomous driving ECU 20 operates the CAN communication circuit to input and output data, stores the input data in the RAM, loads programs stored in the ROM into the RAM, and executes the programs loaded into the RAM. The autonomous driving ECU 20 may be composed of a plurality of electronic units. A part of functions of the autonomous driving ECU 20 may be performed by servers in communication with the vehicle 1.

The external sensor 21 includes at least either a camera or a radar sensor. A camera is an imaging device that images the surrounding environment of the vehicle 1. The camera is provided on a back side of a windshield of the vehicle 1, for example, and captures images in front of the vehicle 1. The radar sensor is a detection device that detects an object around the vehicle 1 using radio waves (for example, millimeter waves) or light. The radar sensor includes, for example, a radar (millimeter wave radar) or a light detection and ranging (LiDAR). The external sensor 21 transmits detection information about objects around the vehicle 1 to the autonomous driving ECU 20.

The map database 22 is a database that stores map information. The map database 22 is formed, for example, in a hard disk drive (HDD) mounted on the vehicle 1. The map information stored in the map database 22 includes, for example, position information of roads, information on road shapes (for example, curvature information), position information of intersections and branch points, and the like.

The map information is map information that can be used while executing autonomous driving control in which visual confirmation of the surrounding environment is required for the driver. The map information may include map information that can be used while executing autonomous driving control in which visual confirmation of the surrounding environment is not required for the driver. The map information may include so-called "high-accuracy map information". The high-accuracy map information means map information with higher accuracy regarding positions of roads, shapes of roads, and the like, than the accuracy of the navigation map.

The internal sensor 23 is an on-vehicle sensor that detects the traveling state of the vehicle 1. The internal sensor 23 may include a vehicle speed sensor, an acceleration sensor, and a yaw rate sensor. Known sensors can be used as the vehicle speed sensor, the acceleration sensor, and the yaw rate sensor. The internal sensor 23 may detect water temperature of the vehicle 1, fuel remaining amount, shift position, and the like, as the vehicle information. The internal sensor 23 transmits detection information about the traveling state of the vehicle 1 to the autonomous driving ECU 20.

The GPS receiver 24 receives signals from three or more GPS-satellites to measure the position of the vehicle 1 (e.g., latitudes and longitudes of the vehicle 1). The GPS receiver 24 transmits measured position information of the vehicle 1 to the autonomous driving ECU 20. The actuator 25 is a device used for traveling control of the vehicle 1 and operates in response to control signals from the autonomous driving ECU 20. The actuator 25 includes at least a drive actuator, a brake actuator, and a steering actuator. The drive actuator is provided in, for example, an engine or an electric motor as a power source, and controls the driving force of the vehicle 1. The brake actuator is provided in a hydraulic brake system, for example, and controls the braking force applied to the wheels of the vehicle 1. The steering actuator is, for example, an assist motor of an electric power steering system (EPS), and controls steering torque of the vehicle 1.

The autonomous driving ECU 20 is configured to be able to recognize vehicle position which is a position of the vehicle 1 on a map, external environment of the vehicle 1, and traveling state of the vehicle 1.

The autonomous driving ECU 20 recognizes an external environment around the vehicle 1 based on detection result of the external sensor 21. The external environment includes a position of an object with respect to the vehicle 1, a relative speed of the object with respect to the vehicle 1, and a moving direction of the object with respect to the vehicle 1, and the like. The external environment may include lane lines and road shapes recognized by lane line recognition processing based on the detection result of the external sensor 21.

The autonomous driving ECU 20 is configured to be able to acquire the map information used for autonomous driving control. The autonomous driving ECU 20 acquires the map information from the map database 22. The autonomous driving ECU 20 may acquire the map information from servers capable of communicating with the vehicle 1 via a communication network.

The autonomous driving ECU 20 recognizes the traveling state of the vehicle 1 based on detection result of the internal sensor 23. The traveling state includes, for example, vehicle speed of the vehicle 1, acceleration of the vehicle 1, and yaw rate of the vehicle 1.

The autonomous driving ECU 20 acquires a vehicle position which is position of the vehicle 1 on the map based on the position information of the GPS-receiver 24 and the map information. The autonomous driving ECU 20 may recognize the vehicle position by a technique of SLAM [Simultaneous Localization and Mapping].

The autonomous driving ECU 20 generates a travel plan of the vehicle 1 based on a destination, the map information, the vehicle position, external environment, and the traveling state (vehicle speed, yaw rate, etc.). The destination may be the destination set by an occupant including the driver or may be a destination proposed by the autonomous driving system 2.

The travel plan includes trajectory of the vehicle 1. The trajectory of the vehicle 1 means a future travel trajectory along which the vehicle 1 will travel according to the autonomous driving control. The autonomous driving ECU 20 calculates a target route (path in a lane unit) of the vehicle 1 to the destination, based on the destination, the current position of the vehicle 1 on the map, and the map information.

The autonomous driving ECU 20 may calculate speed pattern (speed plan) for the vehicle 1 to travel along the trajectory. The autonomous driving ECU 20 may calculate the speed pattern of the vehicle 1 based on the allowable speed of the autonomous driving control set by the occupant, the set speed (for example, legal maximum speed) included in the map information, position information such as stop lines and traffic lights included in the map information, and information related to the external environment such as preceding vehicles and pedestrians. The autonomous driving ECU 20 may generate the travel plan including the trajectory and the speed pattern of the vehicle 1 by calculating the trajectory and the speed pattern of the vehicle 1.

The autonomous driving ECU 20 may execute the autonomous driving control of the vehicle 1 based on the generated travel plan. The autonomous driving ECU 20 may execute the autonomous driving control by controlling the vehicle speed and the steering angle of the vehicle 1 by transmitting control signals to the actuator 25.

[Configuration of Display Device]

Next, an example configuration of the display device 100 will be described. The display device 100 is configured to cause a display 18 (display unit) provided on the vehicle 1 to display a vehicle surroundings image representing a situation around the vehicle 1. The display device 100 mainly includes a display control ECU 10 mounted on the vehicle 1, a touch sensor 16 (steering sensor), a driver monitor camera 17, and the display 18. The display device 100 may include the external sensor 21 for obtaining display information.

The display control ECU 10 is an electronic control unit (computer) including CPU, ROM, RAM, CAN communication circuit, and the like. The display control ECU 10 controls the display 18. The display control ECU 10 may be an electronic control unit incorporated into the display 18. The display control ECU 10 may be a part of the autonomous driving ECU 20. The display control ECU 10 may be composed of a plurality of electronic units. The display control ECU 10 is communicatively connected to the autonomous driving ECU 20, for example. A part of functions of the display control ECU 10 may be performed by servers in communication with the vehicle 1.

The touch sensor 16 is a sensor provided on the steering wheel. The touch sensor 16 is configured to detect a driver's contact with the steering wheel. For example, a capacitive type touch sensor can be used as the touch sensor 16. When the driver's hand comes in contact with the portion of the touch sensor 16 on the steering wheel, the touch sensor 16 transmits a contact signal to the display control ECU 10. The touch sensor 16 may detect a gripping force of the driver's hand gripping the steering wheel. The touch sensor 16 may transmit detected gripping force information of the driver to the display control ECU 10.

The driver monitor camera 17 is an imaging device that images the driver of the vehicle 1. The driver monitor camera 17 is provided, for example, on a cover of a steering column of the vehicle 1. The driver monitor camera 17 images at least a face of the driver. A plurality of the driver monitor camera 17 may be provided in order to image the driver from a plurality of directions. The driver monitor camera 17 transmits imaging information of the driver to the display control ECU 10.

The display 18 is a display that is mounted on the vehicle 1. The display 18 displays an image to the driver. The image is displayed in a predetermined display area of the display 18. The display 18 is controlled by the display control ECU 10 and displays the image in the display area. The display 18 is capable of changing size, shape, brightness, color, and the like of the image.

A liquid crystal display provided on the instrument panel in front of the driver can be used as an example of the display 18. As other examples of the display 18, a head-up display or a liquid crystal display of a navigation system may be used. In the head-up display, the image is projected from a projection unit installed in the instrument panel of the vehicle 1 onto the windshield.

Functions of the display control ECU 10 will be described below. As shown in FIG. 1, the display control ECU 10 has a display information acquisition unit 11, an image generation unit 12, a steering non-holding recognition unit 13, a driver state recognition unit 14, and a display control unit 15 as functional configurations.

The display information acquisition unit 11 is configured to acquire display information including a situation around the vehicle 1 based on the external environment around the vehicle 1. The display information is information used for displaying to the display 18. The display information acquisition unit 11 acquires, for example, the vehicle position of the vehicle 1, the situation around the vehicle 1, and the traveling state of the vehicle 1, as the display information. Here, the display information acquisition unit 11 can use the vehicle position of the vehicle 1, the external environment of the vehicle 1, and the traveling state of the vehicle 1, each recognized by the autonomous driving ECU 20.

The image generation unit 12 is configured to generate a driver presentation image to be displayed on the display 18, based on the situation around the vehicle 1. For example, the image generation unit 12 generates the driver presentation image to be displayed on the display 18 based on the display information acquired from the display information acquisition unit 11. The driver presentation image is an image to be presented to the driver of the vehicle 1. The driver presentation image includes the vehicle surroundings image representing the situation around the vehicle 1 (described in detail later). Here, the image generation unit 12 may generate the driver presentation image to be displayed to the display 18 based on the vehicle position of the vehicle 1, the external environment of the vehicle 1, and the traveling state of the vehicle 1, each recognized by the autonomous driving ECU 20. The image generation unit 12 can generate the driver presentation image by a known method except for setting and adjusting visibility of the vehicle surroundings image, which will be described later. For example, the image generation unit 12 can generate a host vehicle image and an other vehicle image as a part of the driver presentation image by a known method, which will be described later.

The steering non-holding recognition unit 13 is configured to recognize a steering non-holding state based on the detection result of the touch sensor 16. The steering non-holding state is a state in which the driver of the vehicle 1 does not hold steady the steering wheel of the vehicle 1. The steering non-holding state may be a state in which the driver of the vehicle 1 does not hold steady the steering wheel of the vehicle 1 in a steerable manner. Here, "steering non-holding" means so-called hands-off.

The steering non-holding recognition unit 13 may recognize the steering non-holding state if the driver's hand is not in contact with the portion of the touch sensor 16 on the steering wheel for a certain time period, based on contact information of the touch sensor 16. The steering non-holding recognition unit 13 may recognize the steering non-holding state if the state in which the gripping force with which the driver grips the steering wheel is less than a gripping force threshold value continues for a certain time period, based on the gripping force information of the touch sensor 16. The gripping force threshold value is a threshold value of a gripping force for recognizing the steering non-holding state of the driver. The gripping force threshold value may be, for example, a predetermined gripping force smaller than a gripping force with which the driver grips the steering wheel during manual driving. The manual driving means a driving mode in which the driver drives the vehicle 1 by his or her own driving operations. The certain time period is a confirmation time period for recognizing the steering non-holding state. The certain time period may be a predetermined time period. The certain time period may be, for example, 1 to 2 seconds. The certain time period may be 0 seconds. The certain time period may be stored in the display control ECU 10.

The driver state recognition unit 14 may recognize a driver state based on an image captured by the driver monitor camera 17. The driver state means a state of the driver which is used as a material for determining a likelihood that the driver neglects visual confirmation of the surrounding environment. As an example, the driver state includes a reduced alertness status of the driver and a neglecting a visual environment confirmation by the driver.

The driver state recognition unit 14 may acquire a face direction of the driver by a known image processing method based on the imaging information of the driver monitor camera 17, for example. The "face direction" means a direction in which the face itself of the driver faces as a whole. The face direction of the driver can be acquired by a known image processing technique such as pattern matching. The face direction of the driver may be obtained, for example, based on an arrangement of eyes, nose, and mouths in an area corresponding to the face of the driver in the image captured by the driver monitor camera 17. The driver state recognition unit 14 may acquire angle information of the face direction of the driver in each of a yaw angle direction, a pitch angle direction, and a roll direction.

The driver state recognition unit 14 may acquire a line-of-sight direction of the driver based on the imaging information of the driver monitor camera 17. The "line-of-sight direction" means a direction in which a line of sight of the driver is directed. The line-of-sight direction of the driver can be acquired by a known image processing method. The line-of-sight direction of the driver may be acquired based on, for example, a positional relationship between a plurality of points set for the eyes of the driver in the image captured by the driver monitor camera 17. The plurality of points may include a reference point set to an inner corner of the eye or the like, and a moving point set to an iris or the like. The reference point is a point serving as a reference for a relative position of the moving point. The driver state recognition unit 14 may acquire angle information of the line-of-sight direction for each of a yaw angle direction and a pitch angle direction.

The driver state recognition unit 14 may recognize the reduced alertness status of the driver based on the image captured by the driver monitor camera 17. For example, the driver state recognition unit 14 may recognize an arousal level of the driver by a known image processing method based on the imaging information of the driver monitor camera 17. The arousal level of the driver may be recognized from, for example, an eye closing rate per minute of the driver, an eye opening state of the eyes, a blink frequency, an eye movement, a time period change degree of the face direction, presence/absence of a yawning action, or a change degree of an opening of the mouth. The arousal level is a level indicating that the driver is awake rather than in a state in which the consciousness is light-headedly due to lack of sleep or the like. The driver state recognition unit 14 may recognize the reduced alertness status of the driver as the driver state, for example, if the arousal level is less than or equal to a predetermined threshold value.

The driver state recognition unit 14 may recognize the driver's neglecting a visual environment confirmation based on the image captured by the driver monitor camera 17. Neglecting a visual environment confirmation of the driver means a state in which the driver neglects visual confirmation action of the surrounding environment. Neglecting a visual environment confirmation of the driver is, for example, driver's inattentiveness and driver's careless driving. The driver state recognition unit 14 may recognize the neglecting a visual environment confirmation of the driver based on, for example, the face direction or the line-of-sight direction of the driver.

The driver state recognition unit 14 may recognize presence or absence of the driver's inattentiveness by a known method based on the angle information of the face direction and the line-of-sight direction of the driver. The driver's inattentiveness means, for example, a state in which the driver faces out of a predetermined range such as the front. For example, the driver state recognition unit 14 may recognize the driver's inattentiveness as the driver state when the face direction of the driver deviates from the front direction of the driver by a preset angle or more in the yaw angle direction, the pitch angle direction, or the roll direction, over a preset time period. Driver's inattentiveness includes a state in which the driver is gazing at the display 18. The driver state recognition unit 14 may recognize that the driver is gazing at the display 18 when the face direction of the driver is directed to a certain range corresponding to the display 18.

The driver state recognition unit 14 may recognize presence or absence of the driver's careless driving by a known method based on degree of the arousal of the driver, the angle information of the face direction and the line-of-sight direction, or the like. Driver's careless driving means a state in which the driver is not significantly drowsy but neglects visual confirmation action of the surrounding environment. The driver's careless driving is, for example, a state in which the driver is thinking. For example, the driver state recognition unit 14 may recognize the driver's careless driving as the driver state both when the arousal level is not equal to or less than a predetermined threshold value and when a change in the face direction and the line-of-sight direction of the driver remains within a predetermined range for a preset time period.

The display control unit 15 is configured to control the display 18. The display control unit 15 controls the display 18 so that the display 18 displays the vehicle surroundings image in the display 18 based on the detection result of the external sensor 21 of the vehicle 1.

The display control unit 15 displays the vehicle surroundings image in the display 18 with standard visibility when the steering non-holding state does not continue for a predetermined period $T_{11}$ (a first period) or longer, during the autonomous driving control in which the driver is required to visually confirm the surrounding environment. The period $T_{11}$ is a threshold value of time period for reducing visibility of the vehicle surroundings image due to steering non-holding state. The period $T_{11}$ may be a predetermined time period shorter than a hands-on request determination time in a hands-on request condition described below. The period $T_{11}$ may be about 5 seconds, for example. The period $T_{11}$ may be stored in the display control ECU 10. The visibility of the vehicle surroundings image means a degree to which the driver can understand or grasp the situation around the vehicle 1 by watching the vehicle surroundings image displayed on the display 18. Reducing the visibility of the vehicle surroundings image brings it more difficult for the driver to understand or grasp the situation around the vehicle 1, even when the driver watches the vehicle surroundings image displayed on the display 18.

The standard visibility refers to a visibility of the vehicle surroundings image used in a situation not enough for the driver to be to prompted to visually confirm the surrounding situation of the vehicle 1. The standard visibility may be a visibility of the vehicle surrounding image used in a situation in which temporary hands-off that does not exceed a predetermined time period is allowed.

Figures 2A, 2B:
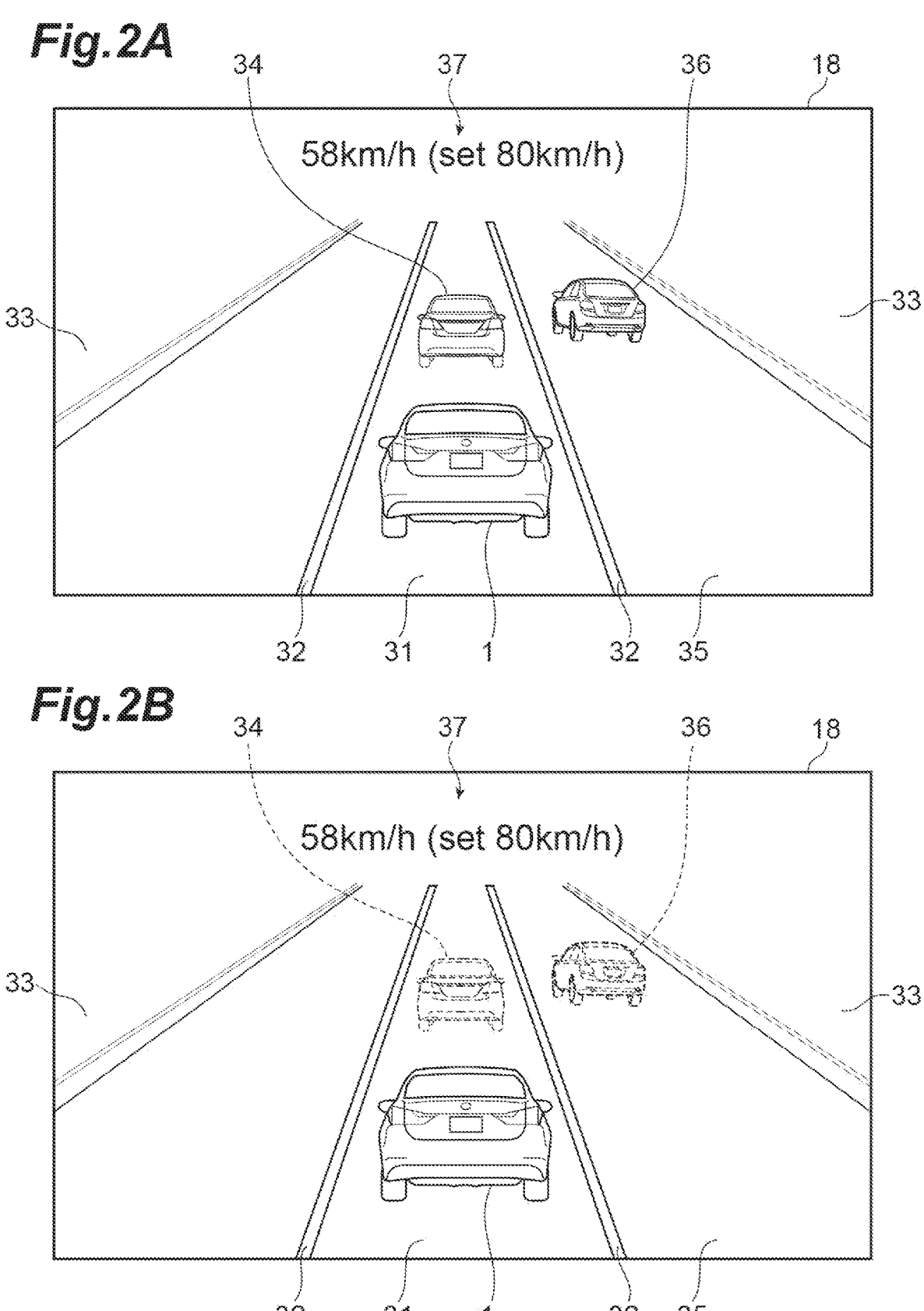
FIG. 2A is a diagram illustrating a display example of a vehicle surroundings image in the display unit with standard visibility.
FIG. 2B is a diagram illustrating an example in which the visibility of the vehicle surroundings image in the display unit is reduced compared to the standard visibility.

FIG. 2A is a diagram illustrating a display example of a vehicle surroundings image in the display unit with standard visibility. FIG. 2A shows an example of the driver presentation image displayed in the display 18 during the autonomous driving control in which the driver is required to visually confirm the surrounding environment. The driver presentation image generated by the image generation unit 12 includes, for example, the vehicle surroundings image representing the situation around the vehicle 1 and an information presentation image (vehicle information image) 37 representing information other than the situation around the vehicle 1.

The vehicle surroundings image may be a bird's-eye view image representing the vehicle 1 as if the vehicle 1 is overlooked from behind. The vehicle surroundings image includes a host vehicle image and an other vehicle image, for example. The host vehicle image is displayed in the image in which the vehicle 1 is viewed from behind, in association with the position of the vehicle 1 in the lane in which the vehicle 1 is currently traveling. The other vehicle image is displayed in the image in which the vehicle 1 is viewed from behind, in association with the position of the other vehicle in the vicinity of the vehicle 1. The vehicle surroundings image may include an object image. The object image is displayed in the image in which the vehicle 1 is viewed from behind, in association with the position of an object other than the other vehicle around the vehicle 1. The vehicle surroundings image is displayed, for example, at the center of the display 18.

The vehicle information image 37 includes at least one of the traveling state of the vehicle 1, vehicle information of the vehicle 1, and environmental information. Examples of the vehicle information image 37 include an image representing an outside air temperature, an image representing a travel distance, an image representing a current time, and an image representing vehicle information. The vehicle information may include water temperature information of the vehicle 1, fuel remaining amount information, shift position information, and the like. The vehicle information image 37 may be displayed around the vehicle surroundings image in the display 18. The vehicle information image 37 may be displayed by being superimposed on the vehicle surroundings image in the display 18.

As an example, in FIG. 2A, images representing a pair of lane lines 32 and road shoulders 33 along a lane 31 where the vehicle 1 travels in the central portion of the display 18 are illustrated with solid lines along the traveling direction of the vehicle 1, as the vehicle surroundings images in the standard visibility. In the lane 31, a host vehicle image representing the vehicle 1 and an other vehicle image representing a preceding vehicle 34 traveling in front of the vehicle 1 in the traveling direction are illustrated with solid lines, as the vehicle surroundings images of the standard visibility. In an adjacent lane 35 of the lane 31, an other vehicle image representing an other vehicle 36 traveling diagonally forward in the traveling direction of the vehicle 1 is illustrated with a solid line as the vehicle surroundings image of the standard visibility. In the example of FIG. 2A, an image representing set vehicle speed of the autonomous driving control being executed is displayed as the vehicle information image 37 above the vehicle surroundings image in the display 18.

The display control unit 15 reduces the visibility of the vehicle surroundings image in the display 18 when the steering non-holding state continues for the predetermined period $T_{11}$ or longer, compared to visibility of the vehicle surroundings image when the steering non-holding state does not continue for the period $T_{11}$ or longer, during the autonomous driving control in which the driver is required to visually confirm the surrounding environment.

FIG. 2B is a diagram illustrating an example in which the visibility of the vehicle surroundings image in the display unit is reduced compared to the standard visibility. FIG. 2B illustrates an example of a driver presentation image displayed on the display 18 when the steering non-holding state continues for a predetermined period $T_{11}$ or longer while the autonomous driving control in which visual confirmation of the surrounding environment is required to the driver is being executed.

As an example, in FIG. 2B, the other vehicle image representing the preceding vehicle 34 and the other vehicle image representing the other vehicle 36 are illustrated with dashed lines. This illustration with the dashed lines in FIG. 2B is just for a convenience of explanation. Reducing the visibility of the vehicle surroundings image in the display unit is not limited to the illustration of the vehicle surroundings image such as the other vehicle image actually with the dashed lines. This illustration with the dashed lines in FIG. 2B may be representing an illustration to make color of the vehicle surroundings image, such as the other vehicle image, paler than the example of FIG. 2A. This illustration with the dashed lines in FIG. 2B may be representing an illustration to increase transparency of the vehicle surrounding image, such as the other vehicle image, relative to the example of FIG. 2A. In these way, in FIG. 2B, the visibility of the other vehicle images of the preceding vehicle 34 and the other vehicle 36 are reduced compared to the example of FIG. 2A.

The display control unit 15 may lower the visibility of the vehicle surroundings image in the display 18 when the steering non-holding state continues for a predetermined period $T_{12}$ (a first period) or longer, compared to visibility of the vehicle surroundings image when the steering non-holding state continues for the period $T_{11}$ or longer and does not continue for the period $T_{12}$ or longer, during the autonomous driving control in which the driver is required to visually confirm the surrounding environment. The period $T_{12}$ is a threshold value of time period for further reducing the visibility of vehicle surroundings image which is already reduced due to steering non-holding state. The period $T_{12}$ may be a predetermined time period that is longer than the period $T_{11}$ and shorter than the hands-on request determination time described below. The period $T_{12}$ may be about 7 seconds, for example. The period $T_{12}$ may be stored in the display control ECU 10.

Figures 3A, 3B:
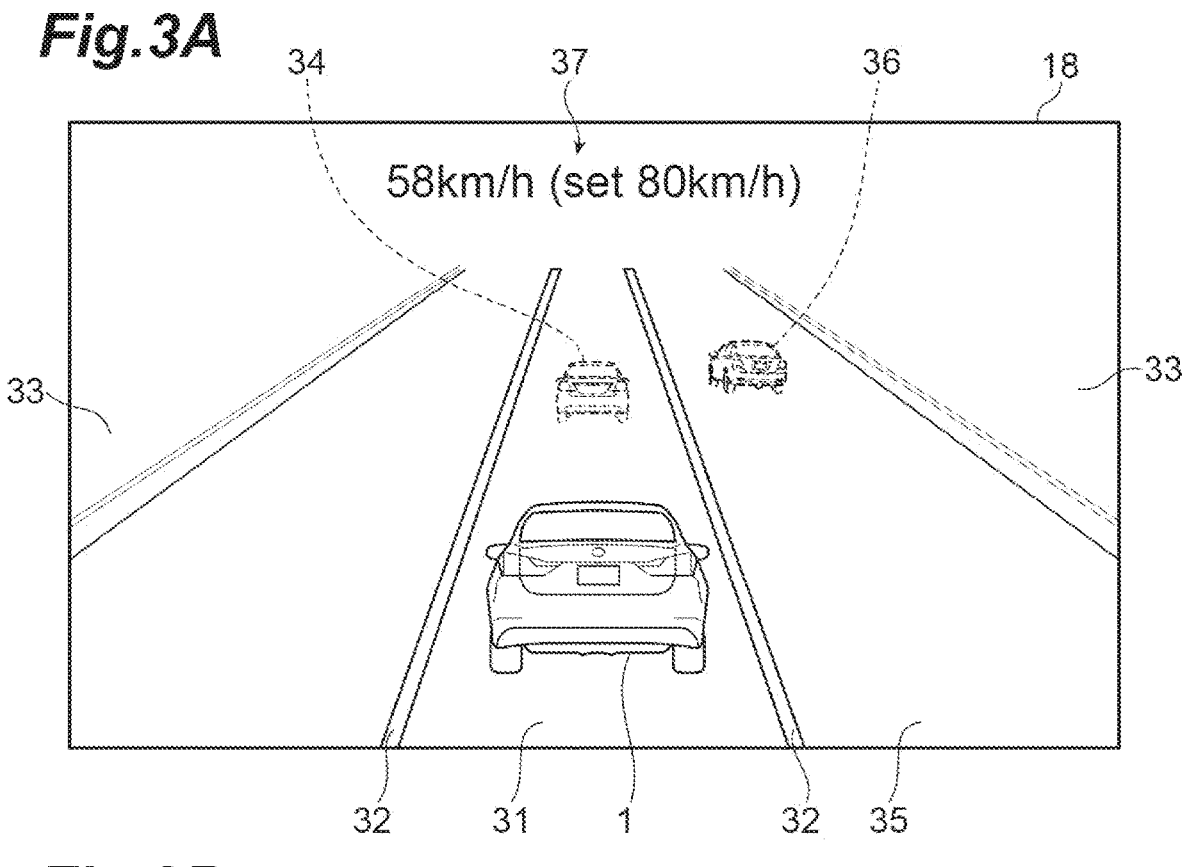
FIG. 3A is a diagram illustrating another example in which the visibility of the vehicle surroundings image in the display unit is reduced compared to the standard visibility.
FIG. 3B is a diagram illustrating still another example in which the visibility of the vehicle surroundings image in the display unit is reduced compared to the standard visibility.

FIG. 3A is a diagram illustrating another example in which the visibility of the vehicle surroundings image in the display unit is reduced compared to the standard visibility. FIG. 3A illustrates an example of a driver presentation image displayed on the display 18 when the steering non-holding state continues for a predetermined period $T_{12}$ or longer while autonomous driving control in which visual confirmation of the surrounding environment is required to the driver is being executed. The visibility of the vehicle surroundings image in FIG. 3A is lower than the visibility of the vehicle surroundings image in FIG. 2B.

As an example, in FIG. 3A, the other vehicle image representing the preceding vehicle 34 and the other vehicle image representing the other vehicle 36 are illustrated smaller than those in the example of FIG. 2B. By being illustrated smaller than the example of FIG. 2B, the visibility of the other vehicle images representing the preceding vehicle 34 and the other vehicle 36 is further reduced compared to the example of FIG. 2B.

The display control unit 15 determines that the hands-on request condition is satisfied, if the steering non-holding state continues for a predetermined period $T_{13}$ (a hands-on request determination time) or longer while autonomous driving control in which the driver is required to visually confirm the surrounding environment is being executed. The display control unit 15 may lower the visibility of the vehicle surroundings image in the display 18 when the hands-on request condition is satisfied, compared to visibility of the vehicle surroundings image when the steering non-holding state continues for the period $T_{12}$ or longer and does not continue for the period $T_{13}$ or longer. The period $T_{13}$ is a threshold value of time period for determining a hands-on request. The hands-on request means a request for the driver to hold steady the steering wheel of the vehicle 1 with the driver's hand. The period $T_{13}$ may be a predetermined time period longer than the period $T_{12}$. The period $T_{13}$ may be about 10 seconds, for example. The period $T_{13}$ may be stored in the display control ECU 10.

FIG. 3B is a diagram illustrating still another example in which the visibility of the vehicle surroundings image in the display unit is reduced compared to the standard visibility. FIG. 3B illustrates an example of a driver presentation image and a hands-on request image displayed on the display 18 when the steering non-holding state continues for a predetermined period $T_{13}$ or longer, during the autonomous driving control in which the driver is required to visually confirm the surrounding environment. The visibility of the vehicle surroundings image in FIG. 3B is lower than the visibility of the vehicle surroundings image in FIG. 3A.

As an example, in FIG. 3B, the other vehicle image representing the preceding vehicle 34 and the other vehicle image representing the other vehicle 36 are covered by a hands-on request image 38. The hands-on request image 38 may be, for example, a popup display that includes a message such as 'Please hold steady the steering wheel.' The popup display may be a figure of message box occupying a certain area on the display 18. The certain area on the display 18 may include images of other vehicles, thereby the images of other vehicles (the surrounding situation of the vehicle) may be overlapped by the hands-on request image 38. As a result of being covered by the hands-on request image 38, the visibility of the other vehicle images representing the preceding vehicle 34 and the other vehicle 36 is further reduced compared to the example of FIG. 3A.

As another example, the display control unit 15 may lower the visibility of the vehicle surroundings image in the display 18 when the neglecting a visual environment confirmation continues for a predetermined period $T_{21}$ (a second period) or longer, compared to visibility of the vehicle surroundings image when the neglecting a visual environment confirmation does not continue for the period $T_{21}$ or longer, during the autonomous driving control in which the driver is required to visually confirm the surrounding environment. The period $T_{21}$ is a threshold value of time period for reducing visibility of vehicle surroundings image due to neglecting a visual environment confirmation. The period $T_{21}$ may be a predetermined time period that is shorter than the period $T_{13}$ (the hands-on request determination time). The period $T_{21}$ may be about 5 seconds, for example. The period $T_{21}$ may be equal to the period $T_{11}$. The period $T_{21}$ may be different from the period $T_{11}$. The period $T_{21}$ may be stored in the display control ECU 10. For example, the display control unit 15 may reduce the visibility of the vehicle surroundings image in the display 18 in the same manner as in FIG. 2B when the neglecting a visual environment confirmation continues for the period $T_{21}$ or longer, during the autonomous driving control in which the driver is required to visually confirm the surrounding environment.

The display control unit 15 may lower the visibility of the vehicle surroundings image in the display 18 when the neglecting a visual environment confirmation continues for a predetermined period $T_{22}$ (a second period) or longer, compared to visibility of the vehicle surroundings image when the neglecting a visual environment confirmation continues for the period $T_{21}$ or longer and does not continue for the period $T_{22}$ or longer, during the autonomous driving control in which the driver is required to visually confirm the surrounding environment. The period $T_{22}$ is a threshold value of time period for further reducing visibility of vehicle surroundings image which is already reduced due to neglecting a visual environment confirmation. The period $T_{22}$ can be a predetermined time period that is longer than the period $T_{21}$ and shorter than the period $T_{13}$ (the hands-on request determination time). The period $T_{22}$ may be about 7 seconds, for example. The period $T_{22}$ may be stored in the display control ECU 10. For example, the display control unit 15 may further reduce the visibility of the vehicle surroundings image in the display 18 in the same manner as in FIG. 3A when the neglecting a visual environment confirmation continues for the period $T_{22}$ or longer, during the autonomous driving control in which the driver is required to visually confirm the surrounding environment.

As still another example, the display control unit 15 may lower the visibility of the vehicle surroundings image in the display 18 when the reduced alertness status continues for a predetermined period $T_{31}$ (a third period) or longer, compared to visibility of the vehicle surroundings image when the reduced alertness status does not continue for the period $T_{31}$ or longer, during the autonomous driving control in which the driver is required to visually confirm the surrounding environment. The period $T_{31}$ is a threshold value of time period for reducing visibility of vehicle surroundings image due to reduced alertness status. The period $T_{31}$ may be a predetermined time period that is shorter than the period $T_{13}$ (the hands-on request determination time). The period $T_{31}$ may be about 5 seconds, for example. The period $T_{31}$ may be equal to the period $T_{11}$. The period $T_{31}$ may be different from the period $T_1$. The period $T_{31}$ may be stored in the display control ECU 10. For example, the display control unit 15 may reduce the visibility of the vehicle surroundings image in the display 18 in the same manner as in FIG. 2B when the reduced alertness status continues for the period $T_{31}$ or longer, during the autonomous driving control in which the driver is required to visually confirm the surrounding environment.

The display control unit 15 may lower the visibility of the vehicle surroundings image in the display 18 when the reduced alertness status continues for a predetermined period $T_{32}$ (a third period) or longer, compared to visibility of the vehicle surroundings image when the reduced alertness status continues for the period $T_{31}$ or longer and does not continue for the period $T_{32}$ or longer, during the autonomous driving control in which the driver is required to visually confirm the surrounding environment. The period $T_{32}$ is a threshold value of time period for further reducing visibility of vehicle surroundings image that is already reduced due to reduced alertness status. The period $T_{32}$ can be a predetermined time period that is longer than the period $T_{31}$ and shorter than the period $T_{13}$ (the hands-on request determination time). The period $T_{32}$ may be about 7 seconds, for example. The period $T_{32}$ may be stored in the display control ECU 10. The display control unit 15 may further reduce the visibility of the vehicle surroundings image in the display 18 in the same manner as in FIG. 3A when the reduced alertness status continues for the period $T_{32}$ or longer, during the autonomous driving control in which the driver is required to visually confirm the surrounding environment, for example.

The display control unit 15 may end the reducing of the visibility caused by the continuation of the steering non-holding state when the continuation of the steering non-holding state comes to an end after the steering non-holding state continues for the first period (the period $T_{11}$ or the period $T_{12}$) or longer, and then the display control unit 15 may display the vehicle surroundings image on the display 18 with standard visibility. The display control unit 15 may end the reducing of the visibility caused by the continuation of the neglecting a visual environment confirmation when the continuation of the neglecting a visual environment confirmation comes to an end after the neglecting a visual environment confirmation continues for the second period (the period $T_{21}$ or the period $T_{22}$) or longer, and then the display control unit 15 may cause the display 18 to display the vehicle surroundings image with standard visibility. The display control unit 15 may end the reducing of the visibility caused by the continuation of the reduced alertness status when the continuation of the reduced alertness status comes to an end after the reduced alertness status continues for the third period (the period $T_{31}$ or the period $T_{32}$) or longer, and the display control unit 15 may cause the display 18 to display the vehicle surroundings image with standard visibility.

Figure 4:
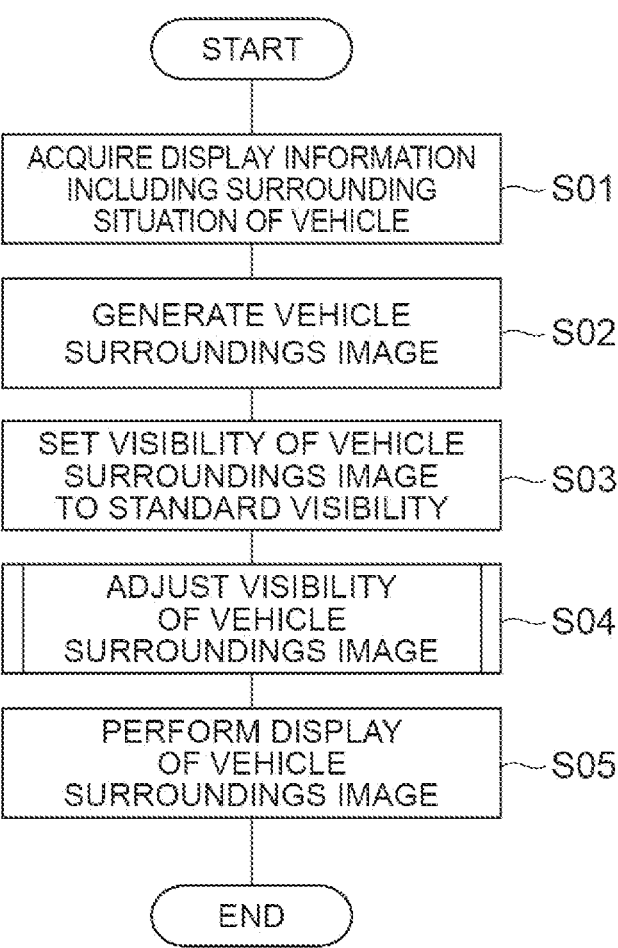
FIG. 4 is a flowchart illustrating an example of processing performed by the display control ECU of the display device.

[Processing of display device, display method, and display program] Next, an example processing of the display device 100 will be described with reference to the flowcharts of FIGS. 4 to 7. FIG. 4 is a flowchart illustrating an example of processing performed by the display control ECU of the display device. The processing (steps) illustrated in FIG. 4 is repeatedly executed at predetermined calculation cycles during traveling of the vehicle 1, for example, by execution of autonomous driving control in which visual confirmation of the surrounding environment is required to a driver.

As shown in FIG. 4, the display control ECU 10 of the display device 100 acquires display information including the surrounding situation of the vehicle 1 by the display information acquisition unit 11 in S01. The display information acquisition unit 11 acquires, for example, a vehicle position of the vehicle 1, a situation around the vehicle 1, and a traveling state of the vehicle 1, as display information. Here, the display information acquisition unit 11 may use information of the vehicle position of the vehicle 1, the external environment of the vehicle 1, and the traveling state of the vehicle 1, recognized by the autonomous driving ECU 20.

In S02, the display control ECU 10 generates a vehicle surroundings image by the image generation unit 12. The image generation unit 12 generates a driver presentation image including the vehicle surroundings image based on the situation around the vehicle 1. The image generation unit 12 generates the driver presentation image to be displayed on the display 18 based on the display information acquired from the display information acquisition unit 11. The image generation unit 12 here may generate the driver presentation image to be displayed to the display 18 based on the vehicle position of the vehicle 1, the external environment of the vehicle 1, and the traveling state of the vehicle 1, recognized by the autonomous driving ECU 20.

In S03, the display control ECU 10 sets the visibility of the vehicle surroundings image to the standard visibility by the display control unit 15. For example, the display control unit 15 sets the visibility of the vehicle surroundings image displayed on the display 18 to the standard visibility.

Figure 6:
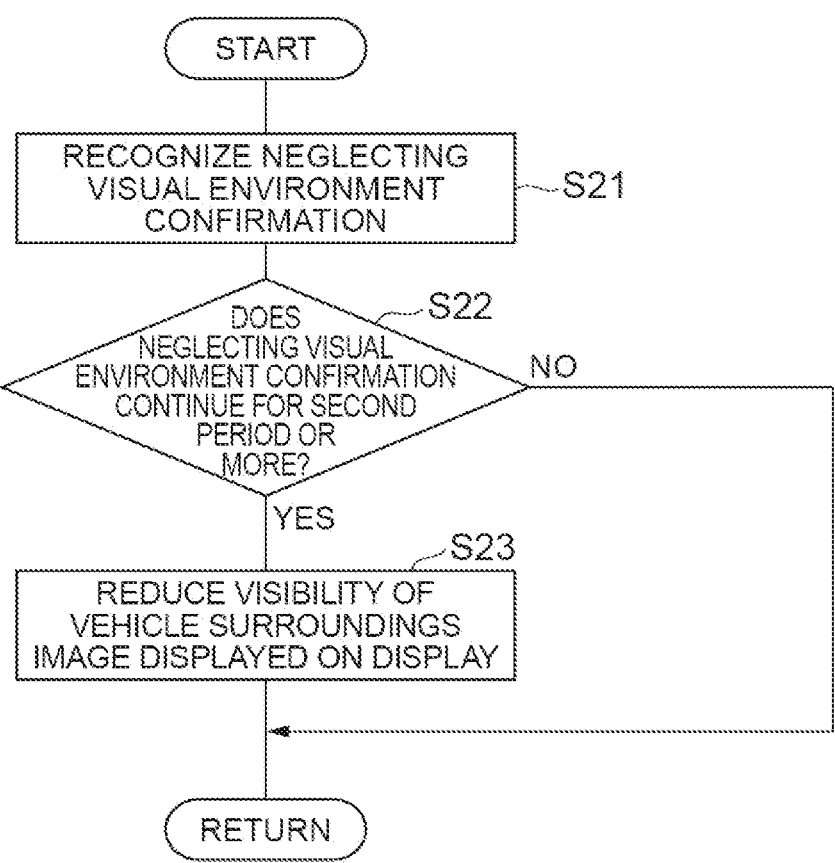
FIG. 6 is a flowchart illustrating another example of the visibility adjustment process of FIG. 4.
Figure 7:
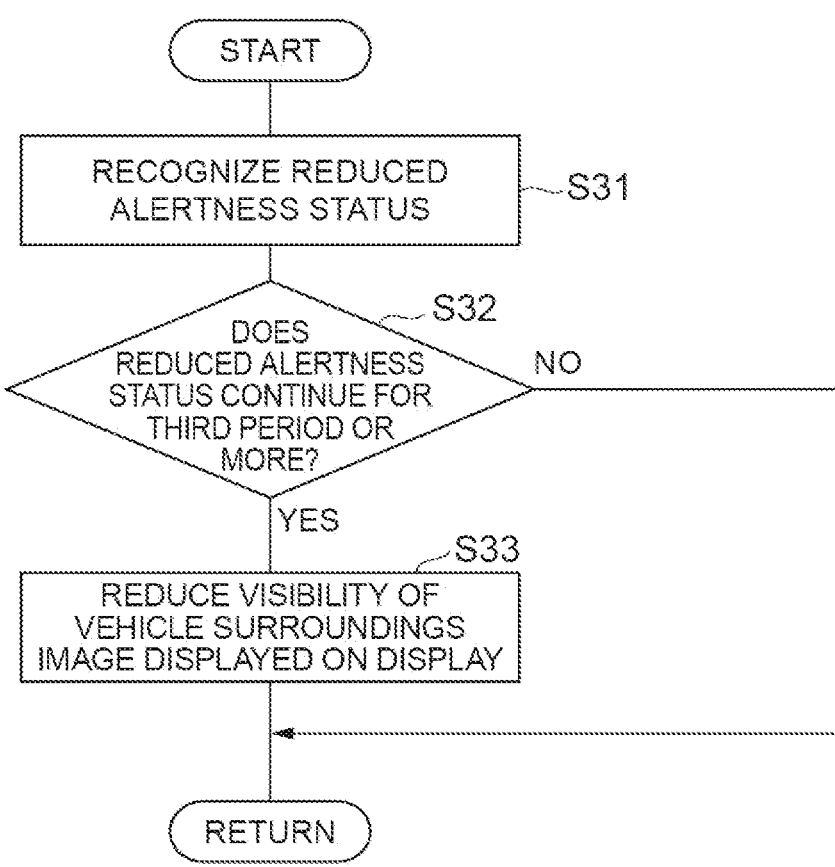
FIG. 7 is a flowchart illustrating still another example of the visibility adjustment processing of FIG. 4.

In S04, the display control ECU 10 adjusts the visibility of the vehicle surroundings image by the display control unit 15. The display control unit 15 performs, for example, the processes of FIGS. 5 to 7, as the adjustment of the visibility of the vehicle surroundings image (visibility adjustment process). The processes (steps) of FIGS. 5 to 7 are executed in the calculation cycle in which the process of FIG. 4 is executed.

Figure 5:
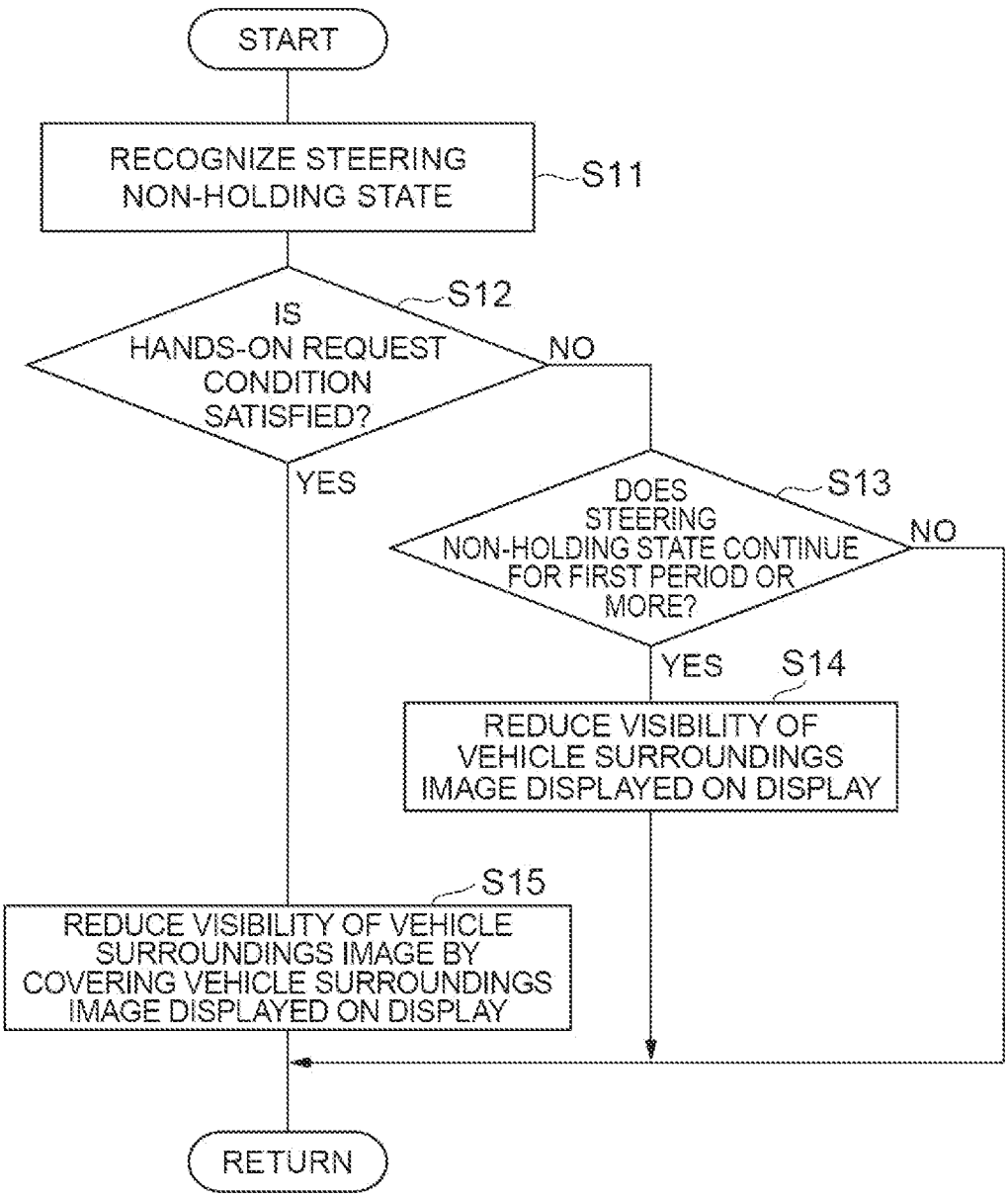
FIG. 5 is a flowchart illustrating an example of the visibility adjustment process of FIG. 4.

As an example of visibility adjustment, FIG. 5 is a flowchart illustrating an example of the visibility adjustment process of FIG. 4. As shown in FIG. 5, the display control ECU 10 recognizes the steering non-holding state by the steering non-holding recognition unit 13 in S11. The steering non-holding recognition unit 13 may recognize the steering non-holding state when the driver's hand is not in contact with the portion of the touch sensor 16 on the steering wheel for a certain time period, based on contact information of the touch sensor 16. The steering non-holding recognition unit 13 may recognize the steering non-holding state when the gripping force of the driver gripping the steering wheel is continuously less than a gripping force threshold value for a certain time period, based on the gripping force information of the touch sensor 16.

In the S12, the display control ECU 10 determines whether or not hands-on request condition is satisfied by the display control unit 15. For example, the display control unit 15 determines that the hands-on request condition is satisfied when the steering non-holding state continues for the hands-on request determination time (the period $T_{13}$) or longer. For example, the display control unit 15 determines that the hands-on request condition is not satisfied when the steering non-holding state does not continue for the hands-on request determination time or longer. The display control ECU 10 proceeds to processing of S13 when the display control unit 15 determines that the hands-on request condition is not satisfied (S12: NO).

In S13, the display control ECU 10 determines whether the steering non-holding state continues for the first period (the period $T_{11}$ or the period $T_{12}$) or longer, by the display control unit 15. The display control ECU 10 proceeds to processing of S14 when the display control unit 15 determines that the steering non-holding state has continued for the first period or longer (S13: YES). The display control ECU 10 ends the processing of FIG. 5 when the display control unit 15 determines that the steering non-holding state has not continued for the first period or longer (S13: NO), and then the display control ECU 10 proceeds to the processing of S05 of FIG. 4.

In S14, the display control ECU 10 makes a visibility adjustment by the display control unit 15, so as to reduce the visibility of the vehicle surroundings image itself displayed on the display 18. For example, the display control unit 15 sets the visibility of the vehicle surroundings image displayed on the display 18 to visibility lower than the standard visibility. The display control unit 15 may change the line type of the vehicle surroundings image from the line type of the vehicle surroundings image when the steering non-holding state does not continue for the first period or longer. The line type of the vehicle surroundings image such as the other vehicle image may be changed from solid lines to dashed lines, for example. The display control unit 15 may make the color of the vehicle surroundings image paler than the color of the vehicle surroundings image when the steering non-holding state does not continue for the first period or longer. The vehicle surroundings image of which color is made paler may be a vehicle surroundings image such as the other vehicle image, for example. The display control unit 15 may increase the transparency of the vehicle surroundings image compared to the transparency of the vehicle surroundings image when the steering non-holding state has not continued for the first period or longer. The vehicle surroundings image of which transparency is made increased may be a vehicle surroundings image such as the other vehicle image, for example. After that, the display control ECU 10 ends the processing of FIG. 5, and proceeds to the processing of S05 of FIG. 4.

On the other hand, the display control ECU 10 proceeds to processing of S15 when the display control unit 15 determines that the hands-on request condition is satisfied (S12: YES).

In the S15, the display control ECU 10 makes a visibility adjustment by the display control unit 15, so as to reduce the visibility of the vehicle surroundings image by covering the vehicle surroundings image displayed on the display 18. For example, the display control unit 15 causes the display 18 to display a popup display that includes a message such as 'Please hold steady the steering wheel' as the hands-on request image 38. The popup display may be a figure of message box occupying a certain area on the display 18. After that, the display control ECU 10 ends the processing of FIG. 5, and proceeds to the processing of S05 of FIG. 4.

As another example of the visibility adjustment, FIG. 6 is a flowchart illustrating another example of the visibility adjustment process of FIG. 4. As shown in FIG. 6, the display control ECU 10 recognizes neglecting a visual environment confirmation by the driver state recognition unit 14 in S21. The driver state recognition unit 14 recognizes the neglecting a visual environment confirmation of the driver based on, for example, the image captured by the driver monitor camera 17. The driver state recognition unit 14 may recognize the inattentiveness of the driver as neglecting a visual environment confirmation, based on the angle information of the face direction and the line-of-sight direction of the driver.

In S22, the display control ECU 10 determines whether neglecting a visual environment confirmation continues for the second period (the period $T_{21}$ or the period $T_{22}$) or longer, by the display control unit 15. The display control ECU 10 proceeds to processing of S23 when the display control unit 15 determines that neglecting a visual environment confirmation has continued for the second period or longer (S22: YES). The display control ECU 10 ends the processing of FIG. 6 when the display control unit 15 determines that the neglecting a visual environment confirmation has not continued for the second period or longer (S22: NO), and then the display control ECU 10 proceeds to the processing of S05 of FIG. 4.

In S23, the display control ECU 10 makes a visibility adjustment by the display control unit 15, so as to reduce the visibility of the vehicle surroundings image itself displayed on the display 18. For example, the display control unit 15 sets the visibility of the vehicle surroundings image displayed on the display 18 to visibility lower than the standard visibility. The display control unit 15 may change the line type of the vehicle surroundings image from the line type of the vehicle surroundings image when the neglecting a visual environment confirmation does not continue for the second period or longer. The line type of the vehicle surroundings image such as the other vehicle image may be changed from solid lines to dashed lines. The display control unit 15 may make the color of the vehicle surroundings image paler than the color of the vehicle surroundings image when the neglecting a visual environment confirmation does not continue for the second period or longer. The vehicle surroundings image of which color is made paler may be a vehicle surroundings image such as the other vehicle image. The display control unit 15 may increase the transparency of the vehicle surroundings image compared to the transparency of the vehicle surroundings image when the neglecting a visual environment confirmation has not continued for the second period or longer. The vehicle surroundings image of which transparency is made increased may be a vehicle surroundings image such as the other vehicle image. After that, the display control ECU 10 ends the processing of FIG. 6, and proceeds to the processing of S05 of FIG. 4.

As still another example of the visibility adjustment, FIG. 7 is a flowchart illustrating still another example of the visibility adjustment processing of FIG. 4. As shown in FIG. 7, the display control ECU 10 recognizes the reduced alertness status by the driver state recognition unit 14 in S31. The driver state recognition unit 14 recognizes the arousal level of the driver based on the image captured by the driver monitor camera 17, for example. The driver state recognition unit 14 may recognize the reduced alertness status of the driver, for example, if the arousal level of the driver is less than or equal to the predetermined threshold value.

In S32, the display control ECU 10 determines whether the reduced alertness status continues for the third period (the period $T_{31}$ or the period $T_{32}$) or longer, by the display control unit 15. The display control ECU 10 proceeds to processing of S33 when the display control unit 15 determines that the reduced alertness status has continued for the third period or longer (S32: YES). The display control ECU 10 ends the processing of FIG. 7 when the display control unit 15 determines that the reduced alertness status has not continued for the third period or longer (S32: NO), and then the display control ECU 10 proceeds to the processing of S05 of FIG. 4.

In S33, the display control ECU 10 makes a visibility adjustment by the display control unit 15, so as to reduce the visibility of the vehicle surroundings image itself displayed on the display 18. For example, the display control unit 15 sets the visibility of the vehicle surroundings image displayed on the display 18 to visibility lower than the standard visibility. The display control unit 15 may change the line type of the vehicle surroundings image from the line type of the vehicle surroundings image when the reduced alertness status does not continue for the third period or longer. The line type of the vehicle surroundings image such as the other vehicle image may be changed from solid lines to dashed lines. The display control unit 15 may make the color of the vehicle surroundings image paler than the color of the vehicle surroundings image when the reduced alertness status does not continue for the third period or longer. The vehicle surroundings image of which color is made paler may be a vehicle surroundings image such as the other vehicle image. The display control unit 15 may increase the transparency of the vehicle surroundings image compared to the transparency of the vehicle surroundings image when the reduced alertness status does not continue for the third period or longer. The vehicle surroundings image of which transparency is made increased may be a vehicle surroundings image such as the other vehicle image. After that, the display control ECU 10 ends the processing of FIG. 7, and proceeds to the processing of S05 of FIG. 4.

Returning to FIG. 4, in the S05, the display control ECU 10 performs the display of the vehicle surroundings image by the display control unit 15. The display control unit 15 causes the display 18 to display the vehicle surroundings image with a set or adjusted visibility. Thereafter, the display control ECU 10 ends the process of FIG. 4.

[Display Program]

The display program causes the display control ECU 10 to function (operate) as the display information acquisition unit 11, the image generation unit 12, the steering non-holding recognition unit 13, the driver state recognition unit 14, and the display control unit 15 described above. The display program is provided by a non-transitory recording medium such as a ROM or a semiconductor memory, for example. The display program may be provided via communication such as a network.

According to the display device 100, the display method, and the display program described above, the visibility of the vehicle surrounding image in the display 18 is reduced when the steering non-holding state continues for a predetermined first period (the period $T_{11}$ or the period $T_{12}$) or longer, compared to visibility of the vehicle surroundings image when the steering non-holding state does not continue for the first period or longer, during the autonomous driving control in which the driver is required to visually confirm the surrounding environment. Accordingly, it becomes more difficult for the driver to confirm the situation around the vehicle 1 by using the vehicle surroundings image in the display 18 than when the steering non-holding state does not continue for the first period or longer. As a result, it is possible to prompt the driver to visually confirm the vehicle surroundings of the vehicle 1 during the autonomous driving control in which the driver is required to visually confirm the surrounding environment.

The visibility of the vehicle surroundings image in the display 18 is reduced when the neglecting a visual environment confirmation continues for a predetermined second period (the period $T_{21}$ or the period $T_{22}$) or longer, compared to visibility of the vehicle surroundings image when the neglecting a visual environment confirmation does not continue for the second period or longer, during the autonomous driving control in which the driver is required to visually confirm the surrounding environment. Accordingly, it becomes more difficult for the driver to confirm the situation around the vehicle 1 by using the vehicle surroundings image in the display 18 than when the neglecting a visual environment confirmation does not continue for the second period or longer. As a result, it is possible to prompt the driver to visually confirm the vehicle surroundings of the vehicle 1 during the autonomous driving control in which the driver is required to visually confirm the surrounding environment.

The visibility of the vehicle surroundings image in the display 18 is reduced when the reduced alertness status continues for a predetermined third period (the period $T_{31}$ or the period $T_{32}$) or longer, compared to visibility of the vehicle surroundings image when the reduced alertness status does not continue for the third period or longer, during the autonomous driving control in which the driver is required to visually confirm the surrounding environment. Accordingly, it becomes more difficult for the driver to confirm the situation around the vehicle 1 by using the vehicle surroundings image in the display 18 than when the reduced alertness status does not continue for the third period or longer. As a result, it is possible to prompt the driver to visually confirm the vehicle surroundings of the vehicle 1 during the autonomous driving control in which the driver is required to visually confirm the surrounding environment.

Although the examples of the present disclosure have been described above, the present disclosure is not limited to the above-described examples.

In the above-described examples, the display control unit 15 reduces the visibility of the vehicle surroundings image in the display 18 when the neglecting a visual environment confirmation continues for a predetermined second period or longer, compared to visibility of the vehicle surroundings image when the neglecting a visual environment confirmation does not continue for the second period or longer, during the autonomous driving control in which the driver is required to visually confirm the surrounding environment. However, examples of the present disclosure are not limited to these examples. The display control unit 15 can omit using the recognition result of the neglecting a visual environment confirmation to reduce visibility of the vehicle surroundings image.

In the above-described examples, the display control unit 15 reduces the visibility of the vehicle surroundings image in the display 18 when the reduced alertness status continues for a predetermined third period or longer, compared to visibility of the vehicle surroundings image when the reduced alertness status does not continue for the third period or longer, during the autonomous driving control in which the driver is required to visually confirm the surrounding environment. However, examples of the present disclosure are not limited to these examples. The display control unit 15 can omit using the recognition result of the reduced alertness status to reduce the visibility of the vehicle surroundings image.

In the above-described examples, the display device 100 was provided with the driver monitor camera 17. However, examples of the present disclosure are not limited to these examples. For example, the driver monitor camera 17 may be omitted, if the display control unit 15 omits using both the recognition result of the neglecting a visual environment confirmation and the recognition result of the reduced alertness status, to reduce the visibility of the vehicle surroundings image.

In the above-described examples, the visibility of the other vehicle image representing the preceding vehicle 34 and the other vehicle 36 is reduced in FIG. 2B and FIG. 3A, as examples in which the display control unit 15 reduces the visibility of the vehicle surroundings image in the display 18. However, examples of the present disclosure are not limited to these examples. For example, the display control unit 15 may reduce the visibility of images representing a pair of the lane lines 32 and the road shoulders 33 along the lane 31, as other vehicle surroundings images of FIG. 2B and FIG. 3A. The display control unit 15 may reduce the visibility of object images displayed in association with positions of objects other than the other vehicle, as other vehicle surroundings images of FIG. 2B and FIG. 3A. In short, the display control unit 15 may lower the visibility of the vehicle surroundings image in FIG. 2B and FIG. 3A than the visibility in FIG. 2A.

In the above-described examples, the other vehicle images representing the preceding vehicle 34 and the other vehicle 36 are covered by the hands-on request image 38 in FIG. 3B. However, examples of the present disclosure are not limited to these examples. For example, in FIG. 3B, the other vehicle images representing the preceding vehicle 34 and the other vehicle 36 may not be displayed instead of being covered by the hands-on request image 38. "Reducing the visibility of the vehicle surroundings image" may include causing the vehicle surroundings image not to be displayed. That is, the display control unit 15 may reduce the visibility of the vehicle surroundings image in the display 18 by causing the vehicle surroundings image not to be displayed when the steering non-holding state continues for a predetermined period $T_{13}$ (the hands-on request determination time) or longer, during the autonomous driving control in which the driver is required to visually confirm the surrounding environment.

In the above-described examples, the first period (the period $T_{11}$), the second period (the period $T_{21}$), and the third period (the period $T_{31}$) are equal to each other. However, examples of the present disclosure are not limited to these examples. At least one of the first period (the period $T_{11}$), the second period (the period $T_{21}$), and the third period (the period $T_{31}$) may be different from the rest of them. In the above-described examples, the first period (the period $T_{12}$), the second period (the period $T_{22}$), and the third period (the period $T_{32}$) are equal to each other. However, examples of the present disclosure are not limited to these examples. At least one of the first period (the period $T_{12}$), the second period (the period $T_{22}$), and the third period (the period $T_{32}$) may be different from the rest of them.

In the above-described examples, the examples of FIG. 2B and FIG. 3A are illustrated in common ways among the steering non-holding state, the neglecting a visual environment confirmation, and the reduced alertness status, in reducing the visibility of the vehicle surroundings images. However, examples of the present disclosure are not limited to these examples. Ways in reducing the visibility of the vehicle surroundings images may be different from each other among the steering non-holding state, the neglecting a visual environment confirmation, and the reduced alertness status.

What is claimed is:

1. A display device configured to display a vehicle surroundings image representing a surrounding situation of a vehicle on an in-vehicle display unit, the display device comprising an electronic control unit configured to:

recognize a steering non-holding state in which a driver of the vehicle does not hold a steering wheel of the vehicle based on detection result of a steering sensor of the vehicle;

display the vehicle surroundings image on the in-vehicle display unit based on detection result of an external sensor of the vehicle; and reduce visibility of the vehicle surroundings image in the in-vehicle display unit by changing a line type of the vehicle surroundings image, lightening a color of the vehicle surroundings image, or increasing a transparency of the vehicle surroundings image when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

2. The display device according to claim 1, wherein the electronic control unit is further configured to:

recognize a neglect of a visual environment confirmation of the driver based on an image captured by a driver monitor camera that images the driver; and reduce visibility of the vehicle surroundings image in the in-vehicle display unit when the neglect of a visual environment confirmation continues for a predetermined second period or longer, compared to visibility of the vehicle surroundings image when the neglect of a visual environment confirmation does not continue for the second period or longer, during execution of autonomous driving control in which the driver is required to visually confirm the surrounding environment.

3. The display device according to claim 1, wherein the electronic control unit is further configured to:

recognize a state of reduced alertness of the driver when an arousal level of the driver is less than or equal to a predetermined threshold value, based on an image captured by a driver monitor camera that images the driver; and reduce visibility of the vehicle surroundings image in the in-vehicle display unit when the state of reduced alertness continues for a predetermined third period or longer, compared to visibility of the vehicle surroundings image when the state of reduced alertness does not continue for the third period or longer, during execution of autonomous driving control in which the driver is required to visually confirm the surrounding environment.

4. The display device according to claim 1, wherein reducing visibility of the vehicle surroundings image comprises changing the line type from solid lines to dashed lines.

5. A display method of displaying a vehicle surroundings image representing a surrounding situation of a vehicle on an in-vehicle display unit, the display method comprising:

a step of recognizing a steering non-holding state in which a driver of the vehicle does not hold a steering wheel of the vehicle based on detection result of a steering sensor of the vehicle, and a step of displaying the vehicle surroundings image on the in-vehicle display unit based on detection result of an external sensor of the vehicle, wherein in the step of displaying the vehicle surroundings image on the in-vehicle display unit, visibility of the vehicle surroundings image in the in-vehicle display unit is to be reduced by changing a line type of the vehicle surroundings image, lightening a color of the vehicle surroundings image, or increasing a transparency of the vehicle surroundings image when the steering non-holding state continues for a predetermined first period or longer, compared to visibility of the vehicle surroundings image when the steering non-holding state does not continue for the first period or longer, during execution of autonomous driving control in which the driver is required to visually confirm a surrounding environment.

6. A non-transitory storage medium storing a display program that causes a computer to function as a display device that displays a vehicle surroundings image representing a surrounding situation of a vehicle on an in-vehicle display unit, the display program causing the computer to:

recognize a steering non-holding state in which a driver of the vehicle does not hold a steering wheel of the vehicle based on detection result of a steering sensor of the vehicle;

display the vehicle surroundings image on the in-vehicle display unit based on a detection result of an external sensor of the vehicle; and reduce visibility of the vehicle surroundings image in the in-vehicle display unit by changing a line type of the vehicle surroundings image, lightening a color of the vehicle surroundings image, or increasing a transparency of the vehicle surroundings image when the steering non-holding state continues for a predetermined first period or longer, compared to a case where the steering non-holding state does not continue for the first period or longer, during execution of autonomous driving control in which the driver is required to visually confirm a surrounding environment.

* * * * *